(12) United States Patent
Farnum et al.

(10) Patent No.: US 10,451,114 B1
(45) Date of Patent: Oct. 22, 2019

(54) INNER RING FOR A BEARING AND METHOD FOR PROPORTIONING LUBRICANT TO A BEARING

(71) Applicant: Rolls-Royce Corporation, Indianapolis, IN (US)

(72) Inventors: David C. Farnum, Indianapolis, IN (US); Andrew V. Schwendenmann, Avon, IN (US); Jared I. Taketa, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 0 days.

(21) Appl. No.: 16/140,706

(22) Filed: Sep. 25, 2018

(51) Int. Cl.
  *F16C 33/66* (2006.01)
  *F02C 7/06* (2006.01)
  *F16C 33/38* (2006.01)

(52) U.S. Cl.
  CPC ............ *F16C 33/6677* (2013.01); *F02C 7/06* (2013.01); *F16C 33/6681* (2013.01); *F05D 2240/54* (2013.01); *F16C 33/3843* (2013.01); *F16C 33/6674* (2013.01)

(58) Field of Classification Search
  CPC .................................................. F16C 33/6677
  See application file for complete search history.

(56) References Cited

U.S. PATENT DOCUMENTS

| | | | |
|---|---|---|---|
| 4,334,720 A * | 6/1982 | Signer | F16C 33/60 384/475 |
| 5,147,721 A | 9/1992 | Baron et al. | |
| 5,183,342 A * | 2/1993 | Daiber | F01D 25/18 384/462 |
| 6,511,228 B2 | 1/2003 | Dusza | |
| 7,488,112 B2 * | 2/2009 | Bouiller | F01D 25/16 384/543 |
| 7,931,407 B2 * | 4/2011 | Begin | F01D 25/18 384/475 |
| 8,292,511 B2 * | 10/2012 | Gibbons | F16C 33/6651 384/462 |
| 8,616,777 B1 * | 12/2013 | Smith | F16C 33/6677 384/475 |
| 9,441,541 B2 | 9/2016 | Wotzak | |
| 9,822,817 B2 | 11/2017 | Price et al. | |
| 10,174,791 B2 * | 1/2019 | Beauvais | F16C 19/02 |

(Continued)

*Primary Examiner* — Thomas R Hannon
(74) *Attorney, Agent, or Firm* — Brink Gilson & Lione (57) ABSTRACT

An inner ring for a bearing comprises a ring body including outer and inner surfaces each extending in a circumferential direction about a longitudinal axis. The outer surface is disposed radially outside the inner surface and includes (a) a raceway for supporting circumferentially arranged rolling elements, (b) a forward separator land, and (c) an aft separator land, where the raceway is axially situated between the forward and aft separator lands. The inner surface includes an annular groove for containing a lubricant under centrifugal forces. Flow passages for distributing the lubricant extend through the ring body from the inner surface to the outer surface, including a set of first flow passages extending from the annular groove to the raceway, a set of second flow passages extending from the annular groove to the forward separator land, and a set of third flow passages extending from the annular groove to the aft separator land.

20 Claims, 4 Drawing Sheets

(56) References Cited

U.S. PATENT DOCUMENTS

| | | | |
|---|---|---|---|
| 2006/0062504 A1* | 3/2006 | Wilton | F01D 25/18 384/475 |
| 2012/0027570 A1* | 2/2012 | Cigal | F01D 25/18 415/110 |
| 2016/0146046 A1 | 5/2016 | Lighty et al. | |
| 2016/0326959 A1 | 11/2016 | Burnside et al. | |

* cited by examiner

INNER RING FOR A BEARING AND METHOD FOR PROPORTIONING LUBRICANT TO A BEARING

TECHNICAL FIELD

The present disclosure is related generally to bearings and more particularly to an inner ring designed for improved lubricant distribution during bearing operation.

BACKGROUND

Gas turbine engines include a compressor, combustor and turbine in flow series along a common shaft. Compressed air from the compressor is mixed with fuel in the combustor to generate hot combustion gases that rotate the turbine blades and drive the compressor. Forward and aft sides of the shaft may be supported by one or more bearings or bearing assemblies. Generally speaking, a bearing includes an outer ring (or outer race), an inner ring (or inner race), and rolling elements (e.g., balls, rollers, etc.) positioned there between. The facing surfaces of the inner and outer rings, along which the rolling elements are free to move, may be referred to as raceways. A separator or cage positioned between the inner and outer rings may be employed to maintain the proper spacing between the rolling elements along the raceway. Critical to the proper functioning of a bearing is effective lubrication, particularly in high-speed applications.

High-speed thrust bearings may require a lubricant to be supplied to forward and aft separator lands on the inner ring as well as to the raceway to ensure proper operation and acceptable operating temperatures. Traditionally, oil is fed from underneath the bearing. For example, an inner surface of a bearing shaft positioned between the bearing and the high-pressure shaft may include discrete scallops and drain holes intended to distribute the oil to the desired location. However, this configuration may utilize an excessive amount of radial space that may not be available in all turbine engine designs.

BRIEF SUMMARY

An inner ring for a bearing comprises a ring body including outer and inner surfaces each extending in a circumferential direction about a longitudinal axis. The outer surface is disposed radially outside the inner surface and includes (a) an annular depression or "raceway" for supporting circumferentially arranged rolling elements, (b) a forward separator land, and (c) an aft separator land, where the raceway is axially situated between the forward and aft separator lands. The inner surface includes an annular groove for containing a lubricant under centrifugal forces. Flow passages extend through the ring body from the inner surface to the outer surface for distribution of the lubricant. The flow passages include a set of first flow passages extending from the annular groove to the raceway, a set of second flow passages extending from the annular groove to the forward separator land, and a set of third flow passages extending from the annular groove to the aft separator land.

A bearing comprises an outer ring, the inner ring described above disposed radially inside the outer ring, and a plurality of circumferentially arranged rolling elements disposed between the inner ring and the outer ring and held in position by a separator.

A method for proportioning lubricant to a bearing comprises rotating a shaft supported by a bearing, which includes an outer ring, the inner ring described above disposed radially inside the outer ring, and a plurality of circumferentially arranged rolling elements disposed between the inner ring and the outer ring and held in position by a separator. A lubricant is supplied to the annular groove from a lubricant source external to the bearing, and lubricant is proportioned to the raceway and forward and aft separator lands via the flow passages in the ring body.

DETAILED DESCRIPTION

Figure 1A:
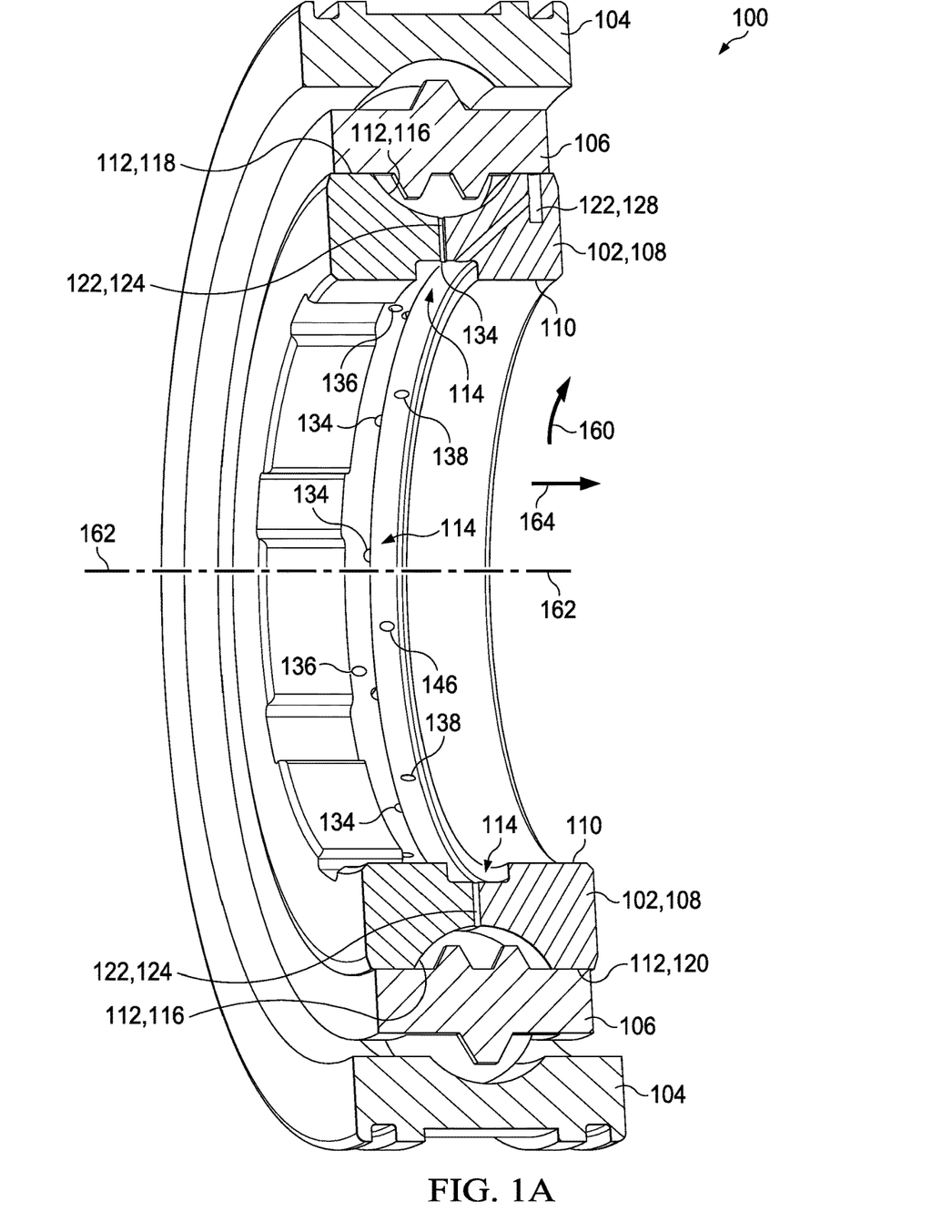
FIG. 1A shows a sectional view of an exemplary high-speed thrust bearing.
Figure 2:
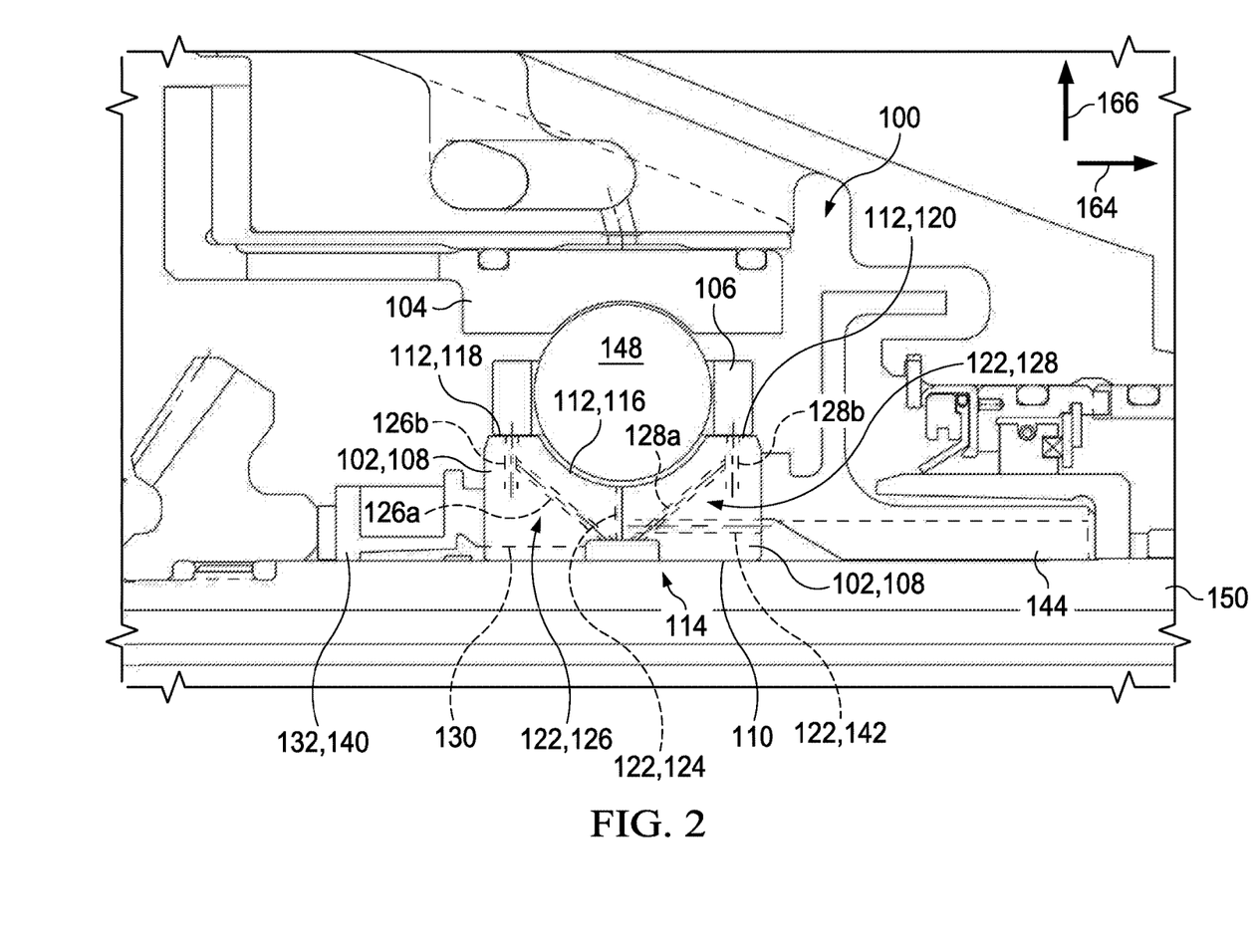
FIG. 2 shows a longitudinal cross-sectional view of a high pressure shaft in a gas turbine engine supported by the high-speed thrust bearing of FIG. 1A, where flow passages within the inner ring are illustrated. Although the flow passages are drawn within in a single plane, it is preferred that the flow passages occupy different circumferential locations, as shown in FIG. 1B.

FIG. 1A shows a view of a bearing or bearing assembly 100 for use at high rotational speeds in a gas turbine engine or other rotary device. The bearing 100 includes an outer ring 104 and an inner ring 102 positioned radially inside the outer ring 104. Circumferentially arranged rolling elements (e.g., balls) 148, which are shown in FIG. 2, are situated between the inner ring 102 and the outer ring 104 and held in position by a separator or cage 106, which is visible in FIG. 1A. The inner ring 102 may alternatively be referred to as an inner race 102, and the outer ring 104 may alternatively be referred to as an outer race 104. The inner ring 102, which is described in detail in this disclosure, has a novel structure to distribute (or proportion) lubricant to parts of the bearing 100 that require lubrication during high speed operation.

Figure 1B:
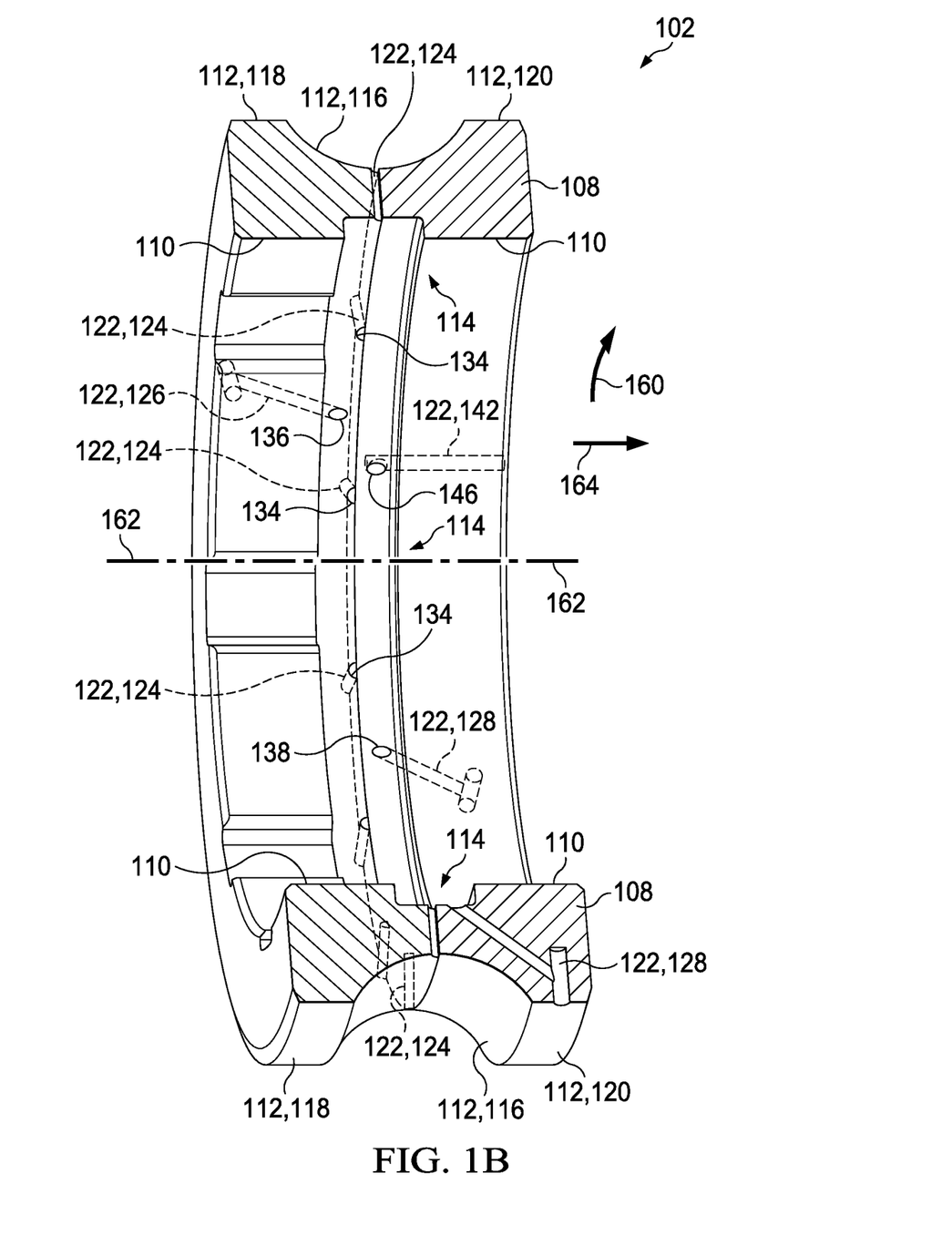
FIG. 1B shows a sectional view of the inner ring of the high-speed thrust bearing of FIG. 1A, including details of the flow passages therein for lubricant proportioning.

Referring now to FIG. 1B, the inner ring 102 includes a ring body 108 that has an outer surface 112 and an inner surface 110 which is disposed radially inside the outer surface 112; each of the inner and outer surfaces 110,112 extends in a circumferential direction 160 about a longitudinal axis 162 of the ring body 108. The outer surface 112 includes an annular depression or "raceway" 116 for supporting a plurality of circumferentially arranged rolling elements. The outer surface 112 also includes a forward separator land 118 and an aft separator land 120 on either side of the annular depression or raceway 116, such that the raceway 116 is situated axially between the forward and aft separator lands 118,120. The raceway 116 and the forward and aft separator lands 118,120 are continuous about the circumference of the ring body 108. The inner surface 110 of the ring body 108 includes an annular groove 114 for containing a lubricant under centrifugal forces.

Flow passages 122 extend through the ring body 108 from the inner surface 110 to the outer surface 112 for distribution of the lubricant. The flow passages 122 include a first set of flow passages 124 extending from the annular groove 114 to the raceway 116, a set of second flow passages 126 extending from the annular groove 114 to the forward separator land 118, and a set of third flow passages 128 extending from the annular groove 114 to the aft separator land 120. As shown in FIGS. 1A and 1B, the sets of first, second and third flow passages 124,126,128 may originate at respective first, second and third axial locations 134,136,138 along the annular groove 114. Preferably, the distance between the first, second and third axial locations 134,136,138 is maximized.

Lubricant proportioning within the inner ring 102 may be achieved by properly controlling the size and number of flow passages 122, such that at any rotational speed, a sufficient depth of lubricant is maintained within the annular groove 114 to ensure thorough coverage of all flow passages 122 and proper lubrication to all targeted locations within the bearing 100. As shown in all of the figures, the annular groove 114 may have a rectangular transverse cross-section, which allows the depth of the lubricant to be uniform along the axial direction 164. It is also preferred that the annular groove 114 is concentric with the mounting diameter of the bearing 100 to ensure consistent depth of the lubricant under rotation.

The inner ring 102 typically includes from 20 to 24 flow passages 122 for proportioning of the lubricant. Each of the flow passages 122 may have a unique location in the ring body 108. As shown in FIG. 1B, the flow passages 122 are preferably separated from each other in the circumferential direction 160. The size, number and arrangement of flow passages 122 in the inventive inner ring 102, as described in further detail below, has been shown via flow analysis to maintain a desired depth (or "head") of lubricant within the annular groove 114 during bearing operation and achieve a suitable lubricant proportioning among the flow passages 122.

The set of first flow passages 124 may typically include from 12 to 16 flow passages 124, where each has a different circumferential location in the ring body 108 but may originate from the same first axial location 134. The first flow passages 124 may be spaced uniformly (e.g., an equal distance apart) about the circumference of the ring body 108. Each of the first flow passages 124 may be positioned normal to the annular groove 114, although other orientations are possible. One or more of the first flow passages 124 may have a transverse cross-sectional shape comprising a half-circle, as can be seen in FIG. 1B, which may be described as a scalloped cross-section. Such a flow passage shape may be readily milled from half of a split inner ring 102. It is also contemplated that one or more of the first flow passages 124 may have a circular cross-section, where the transverse cross-sectional shape comprises a circle. In this case, the first flow passages 124 may have the same cross-sectional shape as the other flow passages 122 in the ring body 108.

The set of second flow passages 126 may typically include from 2 to 4 flow passages, where each has a different circumferential location in the ring body 108 but may originate from the same second axial location 136. The second flow passages 126 may be spaced uniformly about the circumference of the ring body 108. As shown in FIG. 2, each of the second flow passages 126 may include a first portion 126a extending away from the annular groove 114 at an obtuse angle and a second portion 126b arriving at the outer surface 112 normal to the forward separator land 118.

The set of third flow passages 128 may typically include from 2 to 4 flow passages 128, each of which has a different circumferential location in the ring body 108 but may originate from the same third axial location 138. The third flow passages 128 may be spaced uniformly about the circumference of the ring body 108. Each of the third flow passages 128 may include a first portion 128a extending away from the annular groove 114 at an acute angle and a second portion 128b arriving at the outer surface 112 normal to the aft separator land 120.

The inner ring 102 may be fabricated to include the flow passages 122 and the annular groove 114 described herein using machining methods known in the art.

During operation of the bearing 100, centrifugal forces allow a head of lubricant (e.g., oil) to be maintained in the annular groove 114 such that the lubricant can be proportioned as desired through the flow passages 122,124,126, 128. In order to supply the annular groove 114 with lubricant, the inner ring 102 may include a lubricant supply channel 130 extending through the ring body from a lubricant source 132 external to the inner ring 102 to the annular groove 114.

Figure 3:
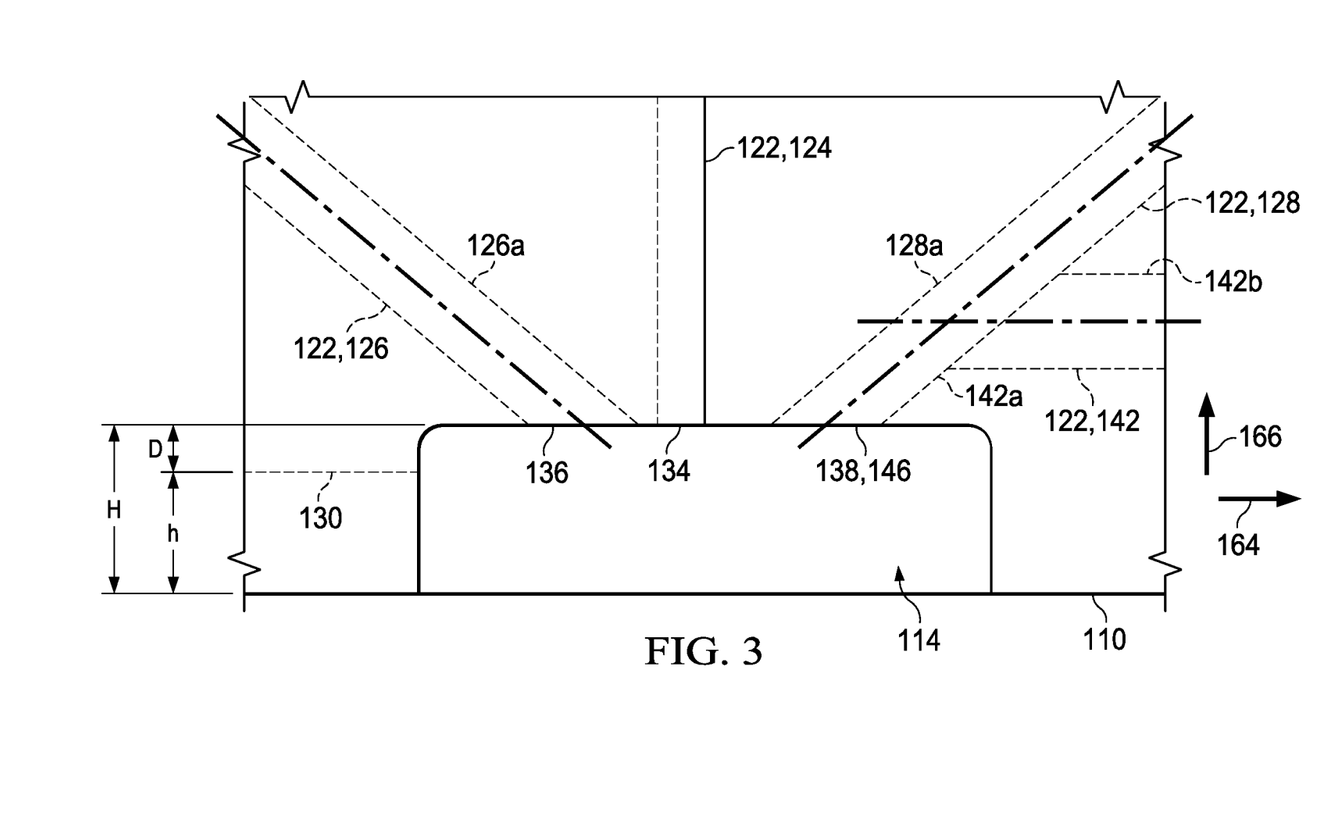
FIG. 3 is a close-up view of a portion of FIG. 2.

As shown in FIG. 2, the lubricant source 132 may comprise a radial accumulator 140 disposed axially forward of the ring body 108. The radial accumulator 140 may be fed by a static (non-rotating) jet of lubricant. The lubricant supply channel 130 may extend from the radial accumulator 140 through the ring body 108 and may terminate in the annular groove 114 for supply of the lubricant. Referring now to FIG. 3, where the lubricant supply channel 130 intersects the annular groove 114, the lubricant supply channel 130 has a radial height h smaller than a radial height H of the annular groove 114. A difference (H−h) between the radial height H of the annular groove and the radial height h of the lubricant supply channel 130 at the intersection thereof may define a maximum fill depth D of the lubricant in the annular groove 114, that is, D=H−h. The difference (H−h) and, consequently, the maximum fill depth D may be, for some bearing designs, at least about 0.020 in (about 0.05 cm), or at least about 0.028 in (about 0.07 cm). If the actual fill depth exceeds the difference (H−h), then backflow of the lubricant may occur and the flow passages 122 may not receive the intended amount of lubricant. Due to limitations on available radial space, it is preferred to minimize the radial height H.

Advantageously, a diameter or width of each of the flow passages 122 may be larger than the maximum fill depth D of the annular groove 114. With this geometry, the flow passages 122 may not be completely filled with lubricant during operation and the flow rate may be controlled by hole entrance losses typically described as "weir" flow. That is, the lubricant may attach to inner walls of the passages 122 as it is accelerated toward the targeted bearing surfaces. In one example, the diameter of each of the flow passages 122 may be in a range from about 0.03 in to about 0.06 in (from about 0.08 cm to about 0.15 cm). The annular groove 114 may have a width, measured along the axial direction 164, in a range from about 0.2 in to about 0.4 in (from about 0.5 cm to about 1.0 cm), and a depth, measured along a radial direction 166, in a range from about 0.05 in to about 0.12 in (from about 0.13 cm to about 0.30 cm). The maximum fill depth D of the annular groove 114 may lie in the range from about 0.020 in to about 0.030 in (from about 0.05 cm to about 0.08 cm) or from about 0.028 in to about 0.030 in (from about 0.07 cm to about 0.08 cm).

It is preferred that entrance and/or exit edges (or openings) of the flow passages 122 be process controlled to allow for consistent flow proportioning. The entrance edges are visible in FIGS. 1A, 1B and 3 at the first, second, and third axial positions 134,136,138. The entrance and/or exit edges may be left sharp without an edge break, for example, to achieve consistent flow results since the flow restrictions and discharge coefficients at each opening may be similar.

The flow passages 122 may further include a set of fourth flow passages 142 extending from the annular groove 114 to a seal 144 (e.g., a carbon seal) disposed axially aft of the ring body 108, as shown in FIG. 2. Thus, the fourth flow passages 142 may supply lubricant to the seal 144. The set of fourth flow passages 142 may include from 3 to 5 flow passages 142, each of which has a different circumferential location in the ring body 108 and may originate from a fourth axial location 146 along the annular groove 114, which may coincide with the third axial location 138, as shown in FIG. 3. The fourth flow passages 142 may be spaced uniformly about the circumference of the ring body 108. Each of the fourth flow passages 142 may include a first portion 142a extending away from the annular groove 114 at an acute angle and a second portion 142b extending through the ring body 108 along the axial direction to reach the seal 144.

As can be observed in FIG. 2, the inner ring may contact the seal 144 at an aft axial location and the radial accumulator 140 at a forward axial location. It is preferred that contacting faces of the components have a minimal leakage gap between them to prevent escape of lubricant. In typical designs, no gap will exist; however, during abnormal operating conditions, a gap may exist and it may be beneficial for the contacting faces to be sized large enough in the radial direction 166 to diminish any leakage.

A method for proportioning lubricant to a bearing is also described in this disclosure. Referring again to FIGS. 1A and 2, the method entails rotating a shaft (e.g., a high pressure shaft) 150 supported by a bearing 100 about a longitudinal axis 162, where the bearing 100 includes an outer ring 104, the inner ring 102 described above disposed radially inward of the outer ring 104, and a plurality of circumferentially arranged rolling elements 148 (visible in FIG. 2) disposed between the inner ring 102 and the outer ring 104, where the inner ring 102 may have any or all of the features set forth herein. The rolling elements 148 may be held in position by a separator or cage 106 disposed between the inner ring 102 and the outer ring 104. The bearing 100 may be a high-speed thrust bearing used in a gas turbine engine. The shaft 150 may be rotated at a speed ranging from about 1,800 RPM to 125,000 RPM.

Lubricant is supplied to the annular groove 114 from a lubricant source 132 disposed external to the bearing 100. Referring to FIG. 2, supplying the lubricant to the annular groove 114 may entail flowing the lubricant from the lubricant source 132 through a lubricant supply channel 130 extending through the ring body 108 and terminating at the annular groove 114. The lubricant source 132 may be a rotating annular structure such as the radial accumulator 140 shown in FIG. 2. The lubricant source 132 may be fed by a static jet of oil or other lubricant. In this example, the lubricant source 132 is disposed axially forward of the inner ring 102, but it is also contemplated that the lubricant source may underlie the bearing assembly 100. The lubricant supplied to the annular groove 114 is proportioned to the raceway 116 and forward and aft separator lands 118,120 via the flow passages 122,124,126,128.

A flow model was created to assess lubricant distribution among the flow passages 122 during bearing operation. The flow model solves for total lubricant (oil) flow and proportioning among the individual flow passages 122. The flow results suggest that, at suitable lubricant flow rates, the weir depth (or head height/depth), which is the depth of lubricant in the annular groove, may be at least about one-third the diameter of the flow passages 122.

During bearing operation using the inner ring 102 described in this disclosure, from about 50% to about 90% of the lubricant may be supplied through the first flow passages 124 to the raceway or annular depression 116, from about 5% to about 25% of the lubricant may be supplied through the second flow passages 126 to the forward separator land 118, and from about 5% to about 25% of the lubricant may be supplied through the third flow passages 128 to the aft separator land 120. In some cases, from about 60% to about 90% of of the lubricant may be supplied through the first flow passages 124 to the raceway or annular depression 116, from about 5% to about 20% of the lubricant may be supplied through the second flow passages 126 to the forward separator land 118, and from about 5% to about 20% of the lubricant may be supplied through the third flow passages 128 to the aft separator land 120. Thus, a suitable lubricant proportioning may be achieved.

In the case where the inner ring 102 further includes a set of fourth flow passages 142 to a seal 144 disposed axially aft of the ring body 108, from about 10% to about 20% of the lubricant may be supplied through the fourth flow passages 142 to the seal 144. Results from the flow modeling for lubricant (oil) proportioning are summarized in Table 1 for exemplary inner ring 102 designs with and without the set of fourth flow passages 142 to the seal 144. In these examples, a bearing speed of at least 2 MDn and an oil flow rate between about 0.5 GPM and about 1.5 GPM may be assumed, where Dn represents the diameter of the bearing in mm multiplied by its speed in RPM. Also in these examples, the inner ring 102 includes 14 first flow passages 124 to the raceway 116, 4 second flow passages to the forward separator land 118, 2 third flow passages to the aft separator land 120, and (optionally) 4 fourth flow passages 142 to the seal 144.

Summarized in Table 2 is the lubricant proportioning to the raceway 116 and forward and aft separator lands 118,120 calculated for different first, second, and third flow passage diameters, assuming a bearing speed of at least 2 MDn and an oil flow rate between about 0.5 GPM and about 1.5 GPM. In these examples, the inner ring 102 includes 14 first flow passages 124 to the raceway 116, 3 second flow passages to the forward separator land 118, and 3 third flow passages to the aft separator land 120.

The flow modeling results demonstrate that a suitable depth of oil can be maintained in the annular groove 114 during high-speed bearing operation to achieve the desired oil proportioning among the flow passages 122.

TABLE 1

Examples of Oil Proportioning With and Without Seal Supply

| Bearing Only Summary: | # of Flow Passages | Diameter (in) | Flow Split |
| --- | --- | --- | --- |
| Fwd Separator Land | 4 | 0.035 | 10-20 |
| Raceway | 14 | 0.035* | 60-80 |
| Aft Separator Land | 2 | 0.035 | 5-15 |
| Total | 20 |  | 100 |
| Bearing Plus Seal Summary: | # of Flow Passages | Diameter (in) | (%) |
| Forward Separator Land | 4 | 0.035 | 12-22 |
| Raceway | 14 | 0.053* | 53-63 |
| Aft Separator Land | 2 | 0.035 | 3-13 |
| Seal Supply | 4 | 0.053 | 12-22 |
| Total Bearing | 20 |  | 78-88 |
| Total Seal | 4 |  | 12-22 |
| Total | 24 |  | 100 |

TABLE 1-continued

Examples of Oil Proportioning With and Without Seal Supply

| | |
|---|---|
| Oil Depth in Annular Groove | at least ⅓ flow passage diameter |

*Equivalent diameter scallops

TABLE 2

Examples of Oil Proportioning as a Function of Flow Passage Diameter

| | # of Flow Passages | Diameter (in) | Flow Split (%) |
|---|---|---|---|
| Example 1 Bearing Summary: | | | |
| Fwd Separator Land | 3 | 0.040 | 13-23 |
| Raceway | 14 | 0.030 | 59-69 |
| Aft Separator Land | 3 | 0.040 | 13-23 |
| Total | 20 | | 100 |
| Example 2 Bearing Summary: | | | |
| Forward Separator Land | 3 | 0.030 | 9-19 |
| Raceway | 14 | 0.040 | 79-89 |
| Aft Separator Land | 3 | 0.030 | 9-19 |
| Total Bearing | 20 | | 100 |
| Oil Depth in Annular Groove | | | at least ⅓ flow passage diameter |

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

Although considerable detail with reference to certain embodiments has been described, other embodiments are possible. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages, and it is not necessarily expected that all of the described advantages will be achieved with every embodiment.

The invention claimed is:

1. An inner ring for a bearing, the inner ring comprising:
a ring body comprising:
an outer surface and an inner surface extending in a circumferential direction about a longitudinal axis, the outer surface being disposed radially outside the inner surface and including (a) a raceway for supporting a plurality of circumferentially arranged rolling elements, (b) a forward separator land, and (c) an aft separator land, the raceway being axially situated between the forward and aft separator lands, and the inner surface including an annular groove for containing a lubricant under centrifugal forces;
flow passages extending through the ring body from the inner surface to the outer surface for distribution of the lubricant, the flow passages including a set of first flow passages extending from the annular groove to the raceway, a set of second flow passages extending from the annular groove to the forward separator land, and a set of third flow passages extending from the annular groove to the aft separator land; and
a lubricant supply channel extending through the ring body to the annular groove from a lubricant source external to the ring body.

2. The inner ring of claim 1, wherein the annular groove has a rectangular transverse cross-section.

3. The inner ring of claim 1, wherein, at an intersection of the lubricant supply channel with the annular groove, the lubricant supply channel has a radial height h smaller than a radial height H of the annular groove.

4. The inner ring of claim 3, wherein a difference (H−h) between the radial height H of the annular groove and the radial height h of the lubricant supply channel defines a maximum fill depth D of lubricant in the annular groove, and wherein the difference is at least about 0.05 cm.

5. The inner ring of claim 1, wherein the sets of first, second and third flow passages originate at different first, second and third axial locations along the annular groove.

6. The inner ring of claim 1, wherein the set of first flow passages includes from 12 to 16 flow passages, each of the first flow passages having a unique circumferential location in the ring body.

7. The inner ring of claim 1, wherein each of the first flow passages is positioned normal to the annular groove.

8. The inner ring of claim 1, wherein each of the first flow passages has a transverse cross-sectional shape comprising a half-circle.

9. The inner ring of claim 1, wherein the set of second flow passages includes from 2 to 4 flow passages, each of the second flow passages having a unique circumferential location in the ring body.

10. The inner ring of claim 1, wherein each of the second flow passages includes a first portion extending away from the annular groove at an obtuse angle and a second portion arriving at the outer surface normal to the forward separator land.

11. The inner ring of claim 1, wherein the set of third flow passages includes from 2 to 4 flow passages, each of the third flow passages having a unique circumferential location in the ring body.

12. The inner ring of claim 1, wherein each of the third flow passages includes a first portion extending away from the annular groove at an acute angle and a second portion arriving at the outer surface normal to the aft separator land.

13. The inner ring of claim 1, wherein the flow passages further comprise a set of fourth flow passages extending from the annular groove to a seal disposed axially aft of the ring body.

14. The inner ring of claim 13, wherein the set of fourth flow passages comprise from 3 to 5 flow passages, each of the fourth flow passages having a unique circumferential location in the ring body.

15. The inner ring of claim 1, wherein a diameter or width of each of the flow passages is larger than a maximum fill depth of lubricant in the annular groove.

16. A bearing comprising:
an outer ring;

the inner ring of claim 1 disposed radially inside the outer ring;

a plurality of circumferentially arranged rolling elements disposed between the inner ring and the outer ring and held in position by a separator.

17. A method for proportioning lubricant to a bearing, the method comprising:

rotating a shaft supported by a bearing comprising: an outer ring, the inner ring of claim 1 disposed radially inside the outer ring, and a plurality of circumferentially arranged rolling elements disposed between the inner ring and the outer ring and held in position by a separator; and supplying lubricant to the annular groove from a lubricant source disposed external to the bearing, wherein the inner ring comprises a lubricant supply channel extending through the ring body to the annular groove, wherein supplying the lubricant to the annular groove comprises flowing the lubricant through the lubricant supply channel, and wherein the lubricant supplied to the annular groove is proportioned to the raceway and forward and aft separator lands via the flow passages in the ring body.

18. The method of claim 17, wherein from about 50% to about 90% of the lubricant is supplied to the raceway, wherein from about 5% to about 25% of the lubricant is supplied to the aft separator land, and wherein from about 5% to about 25% of the lubricant is supplied to the forward separator land.

19. The method of claim 18, wherein the inner ring further comprises a set of fourth flow passages extending from the annular groove to a seal disposed axially aft of the ring body, and wherein from about 10% to about 20% of the lubricant is supplied to the seal.

20. The method of claim 17, wherein the shaft is rotated at a speed in a range from about 1,800 RPM to about 125,000 RPM.

* * * * *